(12) United States Patent
Chang (10) Patent No.: US 9,145,045 B2
(45) Date of Patent: Sep. 29, 2015

(54) BATTERY PACK HOLDING APPARATUS (71) Applicant: Hyundai Motor Company, Seoul (KR)

(72) Inventor: Jung Moon Chang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/291,834

(22) Filed: May 30, 2014

(65) Prior Publication Data
US 2015/0114733 A1    Apr. 30, 2015

(30) Foreign Application Priority Data
Oct. 29, 2013  (KR) .......................... 10-2013-0129293

(51) Int. Cl.
*H01M 2/10* (2006.01)
*B60K 1/04* (2006.01)
(52) U.S. Cl.
CPC ................ *B60K 1/04* (2013.01); *H01M 2/1077* (2013.01); *H01M 2/1083* (2013.01); *H01M 2220/20* (2013.01)
(58) Field of Classification Search
CPC ................ B60L 11/1822; B60K 1/04; B60K 2001/0461; B60K 2001/0438; B60K 2001/0494
USPC .............. 180/68.5; 312/333, 334.44, 334.45, 312/334.46, 334.37, 215, 216, 217, 218, 312/219, 221
See application file for complete search history.

(56) References Cited

U.S. PATENT DOCUMENTS

| | | | | |
|---|---|---|---|---|
| 3,708,028 A * | 1/1973 | Hafer | ........................ | 180/65.1 |
| 5,301,765 A * | 4/1994 | Swanson | ..................... | 180/68.5 |
| 5,360,307 A * | 11/1994 | Schemm et al. | ............. | 414/343 |
| 5,585,205 A * | 12/1996 | Kohchi | ......................... | 429/99 |
| 5,760,569 A * | 6/1998 | Chase, Jr. | ..................... | 320/104 |
| 6,631,775 B1 * | 10/2003 | Chaney | ....................... | 180/68.5 |
| 6,938,553 B2 * | 9/2005 | Tamaki et al. | ................. | 104/34 |
| 8,256,553 B2 * | 9/2012 | De Paschoal | ................ | 180/68.5 |
| 8,517,131 B2 * | 8/2013 | Kovach et al. | ............... | 180/68.5 |
| 8,714,355 B2 * | 5/2014 | Huang | ......................... | 206/503 |
| 2010/0114762 A1 * | 5/2010 | Ishii | .............................. | 705/40 |
| 2011/0234070 A1 * | 9/2011 | Kataoka et al. | ............ | 312/319.1 |
| 2013/0104361 A1 * | 5/2013 | Corfitsen | .................. | 29/402.08 |

FOREIGN PATENT DOCUMENTS

| | | |
|---|---|---|
| JP | 2008-296876 A | 12/2008 |
| KR | 10-0203160 B1 | 3/1999 |
| KR | 10-2004-0067006 A | 7/2004 |

(Continued)

*Primary Examiner* — Brodie Follman
*Assistant Examiner* — Brian Cassidy
(74) *Attorney, Agent, or Firm* — Mintz Levin Cohn Ferris Glovsky and Popeo, P.C.; Peter F. Corless (57) ABSTRACT

A battery pack holding apparatus is disclosed that includes a high-voltage battery pack for a vehicle that has a protrusion at the front end, and a battery pack holder that is installed within a vehicle body and has a front end opening into which the high-voltage battery pack slides into. In addition, a fixed rail is disposed at a front end of the battery pack holder and a moving portion which slides in a width direction of the battery pack holder and along the fixed rail and has a contact portion that comes into contact with the protrusion of the high-voltage battery pack when the high-voltage battery pack slides when the high-voltage battery pack is in the battery pack holder. Further, an elastic portion is disposed in the moving portion to press the contact portion toward the protrusion.

12 Claims, 6 Drawing Sheets

(56) References Cited

FOREIGN PATENT DOCUMENTS

| | | |
|---|---|---|
| KR | 10-2005-0028426 | 3/2005 |
| KR | 10-1080930 | 8/2011 |
| KR | 10-2012-0114490 | 10/2012 |
| KR | 10-2013-0061453 A | 6/2013 |
| KR | 10-2013-0069112 | 6/2013 |
| KR | 10-2013-0061452 | 11/2013 |

\* cited by examiner

BATTERY PACK HOLDING APPARATUS

CROSS-REFERENCE(S) TO RELATED APPLICATION

The present application claims priority of Korean Patent Application Number 10-2013-0129293 filed on Oct. 29, 2013, the entire contents of which is incorporated herein for all purposes by this reference.

BACKGROUND

1. Field of the Invention

The present invention relates to an apparatus for holding a high-voltage battery pack, and more particularly to a battery pack holding apparatus that firmly holds a high-voltage battery pack with use of less force than a conventional apparatus.

2. Description of the Related Art

Due to a global increase in fuel prices and global emission control, improvement in fuel efficiency and development of environment-friendly vehicles have been key issues in the automobile industry. To achieve these objectives, leading automobile companies have developed technologies for reduction of fuel consumption. A representative technology is electric vehicles, which run on electricity. Electric vehicles, such as hybrid vehicles, fuel cell vehicles, and electric cell vehicles are vehicles which store electricity in rechargeable battery packs and are propelled by an electric motor (or electric motors) powered by the rechargeable battery packs.

Generally such an electric vehicle includes a high-voltage battery to power the vehicle motors, and the high-voltage battery should remain electrically fully-charged to power the motors while the vehicle is being driven. Accordingly, the electric vehicle includes a plug for charging to charge the battery in the electric vehicle using an electrical outlet. However, quick charging may be difficult in electric vehicles when the battery is completely discharged during the use of a vehicle. Therefore, a method of replacing the fully-discharged battery with a fully-charged battery has been developed.

However, in the conventional battery replacement the battery may be difficult to be removed once mounted in an electric vehicle, thus increasing a battery replacement time. Accordingly, there is the demand for a battery holding apparatus which may firmly hold a battery mounted as well as allowing the mounted battery to be easily detached as necessary, for example, for replacement.

The foregoing is intended merely to aid in the understanding of the background of the present invention, and is not intended to mean that the present invention falls within the purview of the related art that is already known to those skilled in the art.

SUMMARY

Accordingly, the present invention provides a battery pack holding apparatus that may include an elastic piece that presses a battery pack from front and back sides and left and right sides to stably hold the battery pack in a housing that encases the battery pack and a sloped portion that comes into contact with the battery pack.

According to one aspect of the present invention, a battery pack holding apparatus may include: a high-voltage battery pack having a protrusion at a front end portion; a battery pack holder installed within a vehicle body and having a front end opening that allows the high-voltage battery pack to slide into the battery pack holder; a fixed rail disposed at a front end of the battery pack holder; a moving module that slides along the fixed rail and in a width direction of the battery pack holder and which may include a contact portion that comes into contact with the protrusion of the high-voltage battery pack when the moving module is forced to slide further when the high-voltage battery pack is within the battery pack holder; and an elastic portion disposed in the moving module to press the contact portion toward the protrusion (e.g., to provide a force that presses the contact portion toward the protrusion).

A pair of upper rails that extend in a longitudinal direction of the battery pack may be disposed under the battery pack, and a pair of lower rails engaged with the upper rails may be disposed within the battery pack holder. A sloped portion having a downward slope from an upper end of the upper rail, may be disposed next to (e.g., adjacent to) an outside wall of the upper rail and extend along a longitudinal direction of the upper rail, in which a lower end of the sloped portion may be bent toward the high-voltage battery pack.

The battery pack holding apparatus may further include a side roller installed in the battery pack holder and may come into contact with the bent lower end of the sloped portion and a side elastic portion which may press the side roller toward the bent lower end of the sloped portion. The fixed rail may be installed at a lower portion among portions of the front end of the battery pack holder. In addition, side panels, each extending along a longitudinal direction of the fixed rail, may be disposed at respective sides of the fixed rail in a width direction of the fixed rail, and each side panel may have an aperture to enable an end portion of the protrusion to become positioned in the fixed rail.

Additionally, a first end of the moving module may be equipped with a moving roller that comes into contact with one side panel disposed at the opposite side of the fixed rail. The contact portion may be disposed at a second end of the moving module and may have a sloped shape to cause the contact portion to gradually approach the protrusion as the moving module slides toward the protrusion. The protrusion may be a roller. A first end of the elastic portion may be supported by the first end of the moving roller and a second end of the elastic portion may come into contact with the second end of the moving module, pressing the contact portion toward the protrusion. Further, driving units may be disposed at respective ends of the fixed rail in the longitudinal direction of the fixed rail and may be connected to respective ends of the moving module in the longitudinal direction of the moving module, to cause the moving module to slide along the fixed rail. The driving unit may be equipped with a piston and a cylinder and may be configured to move the piston with air pressure or oil pressure to move the moving module.

According to the battery pack holding apparatus having the above-described structure, the side elastic portion and the side roller may prevent the battery pack from shaking in the width direction and the moving module may prevent the battery pack from shaking in the longitudinal direction. Accordingly, the battery pack may be more stably and firmly held in the battery pack holder without shaking and displacement. Furthermore, the roller-shaped protrusion and the sloped portion enable the moving module to gradually and more smoothly press the protrusion, and thus may enable the battery pack holding device to firmly hold the battery pack with use of less force than a conventional holding device.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, exemplary embodiments of the present invention will be described in detail with reference to the accompanying drawings. Hereinbelow, a battery pack holding apparatus according to the exemplary embodiment of the present invention will be described in detail with reference to the accompanying drawings.

Figure 1:
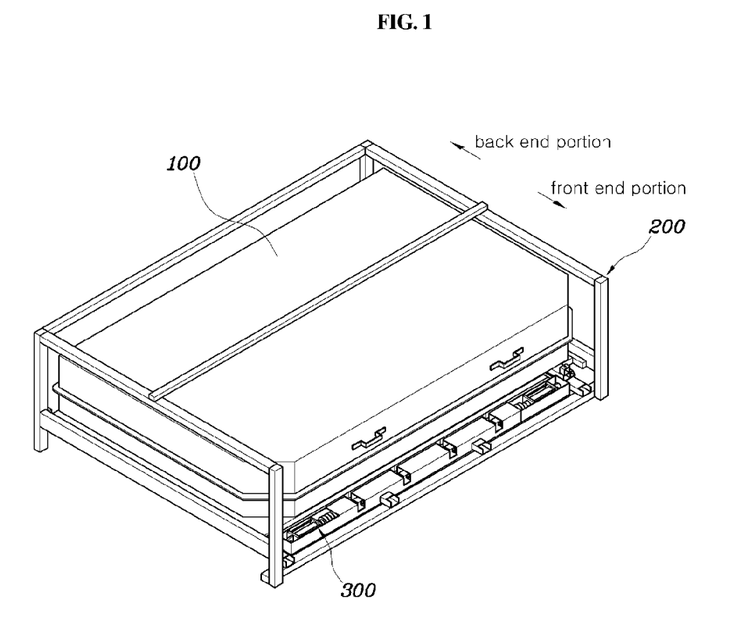
FIG. 1 is an overall exemplary view of a battery pack holding apparatus according to an exemplary embodiment of the present invention.

FIG. 1 is an overall exemplary view of a battery pack holding apparatus according to one exemplary embodiment of the present invention. With reference to FIGS. 1 to 6, the battery pack holding apparatus may include a high-voltage battery pack 100 for a vehicle having a protrusion 110 that protrudes from a front end of the battery pack 100, a battery pack holder 200, a fixed rail 300, a moving portion 500, and an elastic portion 530.

The battery pack holder 200 may be installed within a vehicle body and may include a front end opening into which the high-voltage battery pack 100 may be slid into. The fixed rail 300 may be disposed at a front end portion of the battery pack holder 200 and disposed in a width direction of the battery pack holder 200. The moving portion 500 may slide along the fixed rail 300 and in a width direction of the battery pack holder 200. The moving portion 500 may include a contact portion 510 that comes into contact with the protrusion 110 of the high-voltage battery pack 100 when the moving portion 500 is forced to slide when the battery pack 100 is within the battery pack holder 200. The elastic portion 530 may be disposed within the moving portion 500 to press the contact portion 510 toward the protrusion 110. In other words, the elastic portion 530 may create a force that pushes against the contact portion 510 toward the protrusion 110.

Figure 2:
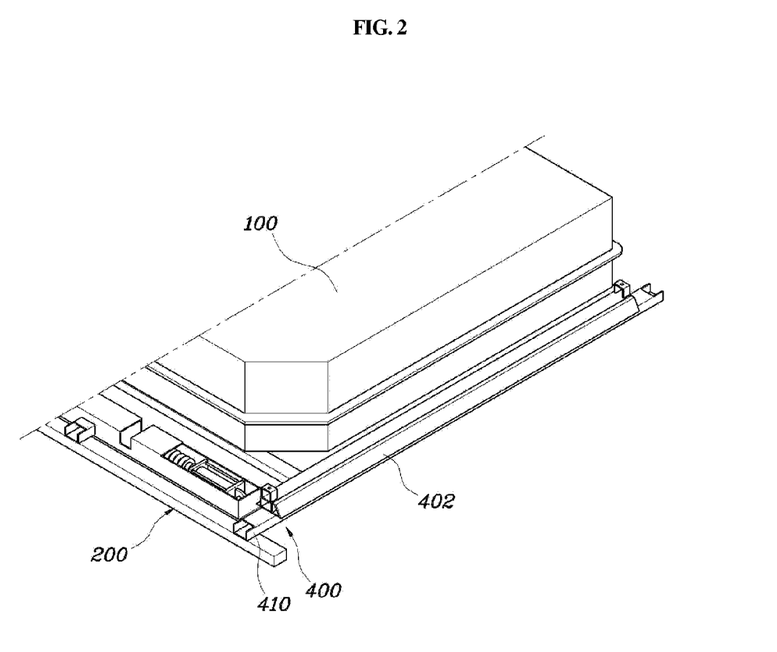
FIG. 2 is an exemplary side elevation of the battery pack holding apparatus according to the exemplary embodiment of the present invention.

Furthermore, as illustrated in FIG. 2, the battery pack 100 may include a pair of upper rails 400 that extend in a longitudinal direction, on an underside surface of the battery pack 100. In addition, the battery pack holder 200 may include a pair of lower rails 410 to be engaged with the pair of upper rails 400 in an inside space of the battery pack holder 200. The longitudinal direction may be a direction along which the battery pack 100 may be inserted into the battery pack holder 200.

The upper rails 400 and the lower rails 410 may be disposed at respective sides of the battery pack 100 and the battery pack holder 200 in the width direction perpendicular to the longitudinal direction. The upper rails 400 and the lower rails 410 may be in frictional contact with each other to cause the upper rails 400 to slide on the lower rails 410. However, a rail roller (not shown) fixed to either the upper rail 400 or the lower rail 410 may be disposed between the upper rail 400 and the lower rail 410. In particular, the upper rails 400 may slide on the lower rails 410 via the rail rollers (not shown). The upper rail 400 may have a sloped portion 401 that slopes down from an upper surface of the upper rail 400. The sloped portion 401 may be disposed outside the upper rail 400 (e.g., on an outside surface of the upper rail 400) and extend along the upper rail 400. A lower end of the sloped portion 401 may be bent downward and inward, i.e., toward the battery pack 100. The upper rail 400 may include a side roller 420 installed within the battery pack holder 200 and that may come into contact with the slope 401, and a side elastic portion 430 that presses the side roller 420 toward the sloped portion 401.

Figure 3:
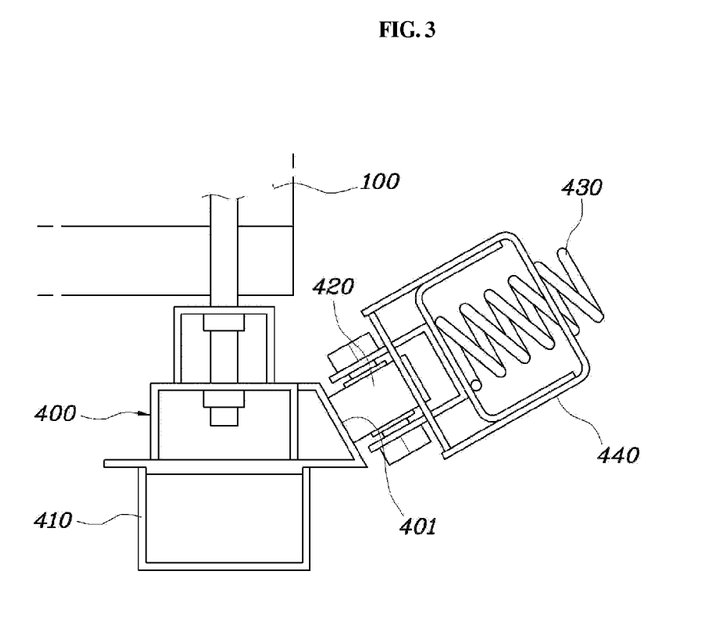
FIG. 3 is an exemplary cross-sectional view of a fixed rail according to an exemplary embodiment of the present invention.

With reference to FIG. 3, the sloped portion 401 may obliquely face up and may be disposed extraneous to the battery pack 100 in a side view, and the sloped portion 401 may not face the battery pack 100. The side roller 420 may come into contact with the sloped portion 401 and press (e.g., push) the sloped portion 401 when the side roller 420 is pressed by the side elastic portion 430. Accordingly, the load may be applied sideways and downwardly to the battery pack 100 to more stably hold the battery pack 100 in the battery pack holder 210 and to fix the battery pack 100 in the width direction and vertical direction.

For more stable placement of the battery pack 100, the side roller 420 and the side elastic portion 430 may be fixed to respective side surfaces of the battery pack holder 200, and the side roller 420 and the side elastic portion 430 each may be plural in number (e.g., the holder may include a plurality of side rollers 420 and a plurality of side elastic portions 430). In addition, side brackets 440 combined with the side rollers 420 and the side elastic portions 430 may be configured to fix the side rollers 420 and the side elastic portions 430 to the sides of the battery pack holder 200. The side brackets 440 may be fixed to the sides of the battery pack holder 200 via bolts or welding.

Figure 4:
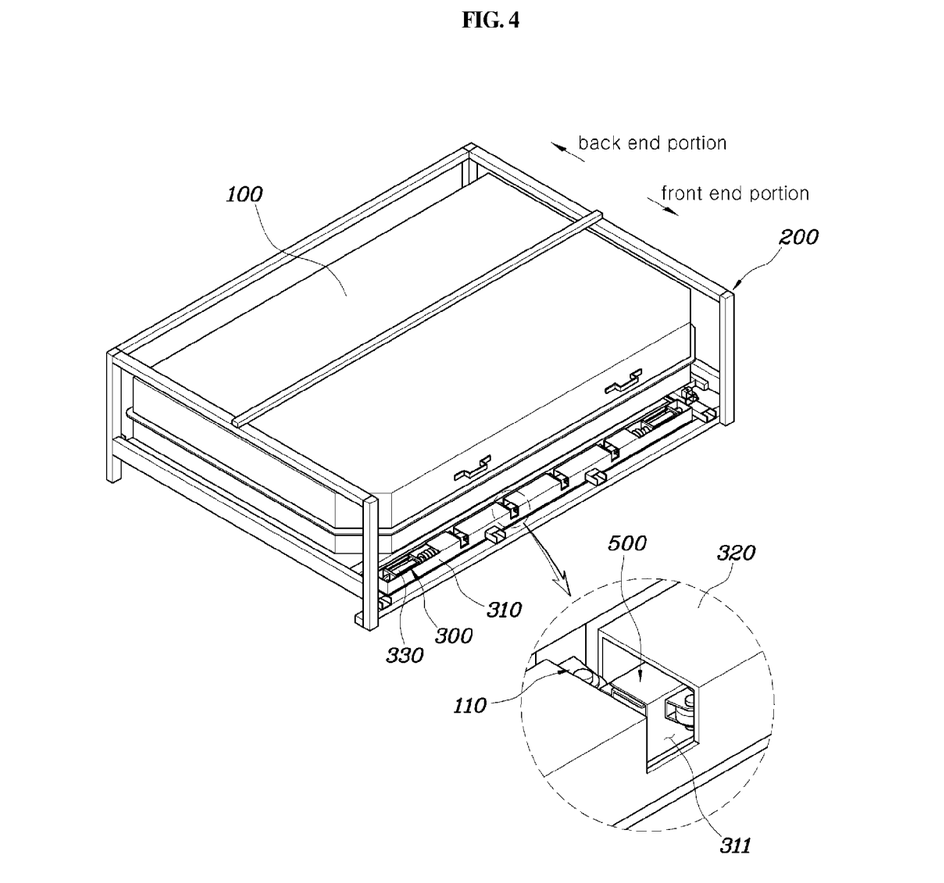
FIG. 4 is an exemplary view illustrating a front end portion of a battery pack holder according to an exemplary embodiment of the present invention.

FIG. 4 illustrates an exemplary front end portion of the battery pack holder 200. The fixed rail 300 may be installed at a lower edge of a frame portion at a front end of the battery pack holder 200. A protrusion 110 may protrude from a bottom surface of the battery pack 100. The fixed rail 300 and the moving module 500 may be disposed at the lower end of the battery pack 100 to face the protrusion 110. Accordingly, the battery pack 100 having a center of gravity at a lower end thereof may be fixed more stably. A plurality of moving modules 500 may be installed along the fixed rail 300. In particular, the multiple moving modules 500 that correspond to the multiple protrusions 110 may press a back end portion of the battery pack 100 to more stably hold the battery pack 100 in the battery pack holder 200. Since the back end of the battery pack holder 200 may a closed (e.g., not have an opening) and the moving module 500 may be installed at the front end of the battery pack 100, the battery pack 100 may be more stably fixed by pushing the battery pack 100 backward.

Figure 5:
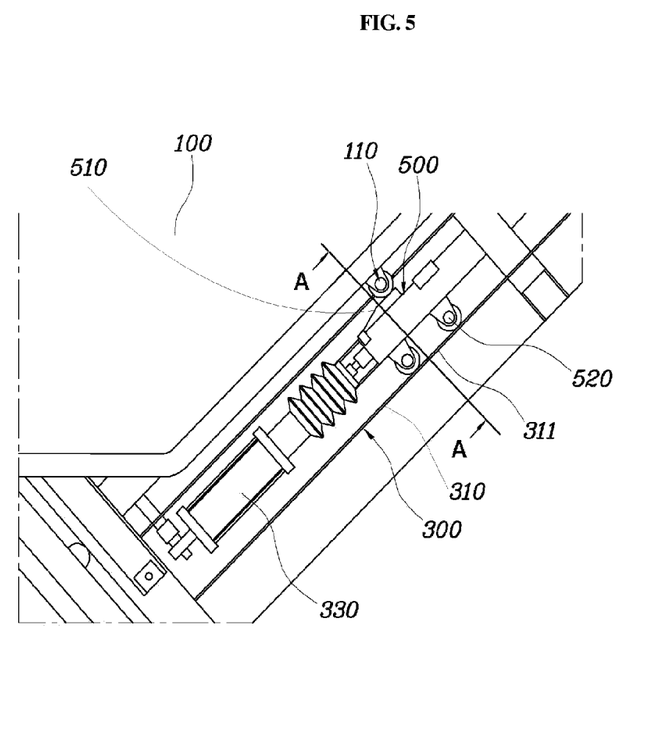
FIG. 5 is an exemplary transverse-sectional view of a moving module as seen from above according to an exemplary embodiment of the present invention.

With reference to FIG. 5, side panels 310 may extend along the longitudinal direction of the fixed rail 300, at respective sides of the fixed rail 300. A plurality of apertures 311 may be formed in the side panels 310 in a position that corresponds to the protrusion 110 in the longitudinal direction to position an end of the protrusion 110 within the fixed rail 300. An opening may be formed in an upper panel 320 of the fixed rail 30 and the opening may be connected to the apertures 311 in the position that corresponds to the protrusion 110 in the longitudinal direction. The protrusion 110 formed on the bottom surface of the battery pack 100 may guide the battery pack 100 along the side panels 310 when the battery pack 100 is inserted into the battery pack holder 200 through the apertures 311. Accordingly, the apertures 311 and the protrusions 110 may be equal in number.

When the battery pack 100 is inserted into the battery pack holder 200, the moving portion 500 should not be located in a position that corresponds to the protrusion 110, i.e., a position where the aperture 311 is formed. Accordingly, when the battery pack 100 is not inserted into the battery pack holder 200, the moving portion may be disposed between the apertures 311. In addition, a first end, front end, of the moving portion 500 may include a moving roller 520 that comes into contact with one of the side panels 310 disposed at respective sides of the fixed rail 300. The moving roller 520 may facilitate the sliding of moving module 500. The side panel 310 (e.g., a first side panel) with which the moving roller 520 comes into contact may be disposed on the front side, and the other side panel 310 (e.g., a second side panel) may be disposed on the back side. A plurality of moving rollers 520 may be provided for each moving portion 500 to guide the moving portion 500 more stably.

Further. the contact portion 510 may be formed at a second end, back end, of the moving portion 500 and may be sloped down to gradually approach the protrusion 110 as the moving portion 500 slides toward the protrusion 110. Since the contact portion 510 may be sloped, the contact portion 510 may gradually press the protrusion as the moving portion 500 slides. Accordingly, even when the moving portion 500 is made to slide with force less than the force of pressing the protrusion 110 from the front side, the protrusion 110 may be pressed toward the back end portion. The protrusion 110 may have a roller shape to provide a more smooth movement along the sloped path when the contact portion 510 moves.

As described above, an elastic portion 530 may be disposed within the moving portion 500 to cause the contact portion 510 to slide along the fixed rail 300 while the contact portion 510 remains in contact with the protrusion 110. The first and second ends of the moving module 500 may be bent to cause the entire body of the moving module 500 to form a "C" shape when viewed as a whole. The first and second ends may be referred to as bent portions 540 and 550 and may be arranged to face each other. The bent portions 540 and 550 may overlap each other to form a housing that surrounds the elastic portion 530. The first end and the second end may be separately formed to move independently, that is, the first end in the front direction and the second end in the back direction, or vice versa.

The elastic portion 530 may press outward on the first end and may press the second end of the moving portion 550 from the inside. Since the moving roller 520 may be supported by the side panel 310 disposed at the first end of the moving portion 500, the elastic force of the elastic portion 530 may be applied to the second end, pressing the contact portion 510 disposed at the second end side toward the protrusion 110. Since the back end of the battery pack holder 200 is a closed region, the pressing of the contact portion 510 toward the back end portion of the battery pack holder 200 may enable the battery pack 100 to be more stably supported.

Additionally, driving units 330 may be installed at respective ends of the fixed rail 300 in the longitudinal direction. The driving units 330 may be connected to respective ends of the moving portion 500 in the longitudinal direction to drive the moving portion 500 to slide along the fixed rail 300. When an operation signal, such as a signal generated by an operator's switching-on operation, is externally input, the driving units 330 may be configured to drive the moving portion 500 to slide.

In particular, the driving unit 330 may be a pneumatic system equipped with a piston and a cylinder. Accordingly, the driving unit 330 may be configured to move the piston with air pressure to move the moving portion 500. Alternatively, the driving unit 330 may be a hydraulic system which moves the piston with oil pressure. The driving units 330 may be installed at respective ends of the fixed rail 300 in the longitudinal direction, respectively. When operating the driving units 330, air pressure or oil pressure may be applied to either one of the driving units 330 and the piston in the driving unit 330, to which the air pressure or oil pressure may be applied, to move the piston to cause the moving portion 500 to be moved. Most of the moving portions 500 may be connected to each other so that the multiple moving portions 500 may be moved together by the operation of the driving units 330. Lower ends of the moving portions 500 may be connected by a panel to prevent the moving portions 500 from blocking the apertures 311.

Figure 6:
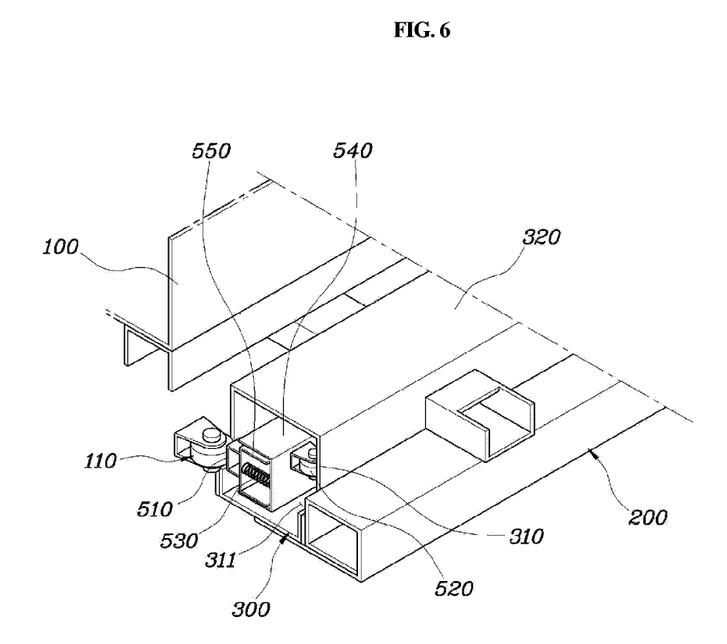
FIG. 6 is an exemplary cross-sectional view of the moving module shown in FIG. 5 according to an exemplary embodiment of the present invention.

FIG. 6 is an exemplary cross-sectional view taken along line A-A of FIG. 5 and illustrates sections of the fixed rail 300 and the moving module 500. As illustrated in FIG. 6, the first end of the moving portion 500 may include with the moving roller 520 which comes into contact with the side panel 310 and the second end of the moving portion 500 may include the contact portion 510 which comes into contact with the protrusion 110. Furthermore, the elastic portion 530 may be installed in the moving roller 520, and a portion of the protrusion 110 may be inserted into the fixed rail 300 through the aperture 311. The contact portion 510 may enter into the protrusion 110 while in the fixed rail 300. The elastic portion 530 may be configured to press the contact portion 510 and the contact portion 510 may be configured to press the protrusion 110. Accordingly, the battery pack 100 may be pushed backward. The fixed rail 300 may be covered by a fixed rail cover 320. The fixed rail cover 320 may have a plurality of openings that correspond to the apertures of the fixed rail 300.

According to the battery pack holding apparatus having the above-described structure, the side elastic portion 430 and the side roller 420 may prevent the battery pack 100 from shaking and displacement in the width direction. Furthermore, the moving portion 500 may prevent the battery pack 100 from shaking and displacement in the longitudinal direction. Accordingly, the battery pack 100 may be more stably and firmly held in the battery pack holder 200 without shaking and displacement. In addition, the protrusion 110 having a roller shape and the contact portion 510 having a sloped shape may enable the moving portion 500 to gradually and more smoothly press the protrusion 110, to firm holding the battery pack 100 with use of less force than a conventional holder.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A battery pack holding apparatus, comprising:
a high-voltage battery pack for a vehicle, wherein the high-voltage battery pack has a protrusion that protrudes from a front end of the battery pack;
a battery pack holder installed within a vehicle body and having a front end opening into which the high-voltage battery pack is placed;
a fixed rail installed at a front end of the battery pack holder and extending in a width direction of the front end;
a moving portion installed to slide along the fixed rail in a width direction of the battery pack holder, wherein the moving portion has a contact portion which comes into contact with the protrusion of the high-voltage battery pack when the high-voltage battery pack is forced to slide further when the high-voltage battery pack is inserted in the battery pack holder;
an elastic portion disposed in the moving portion to press the contact portion toward the protrusion; and
a plurality of side panels, each extending along a longitudinal direction of the fixed rail and disposed at respective sides of the fixed rail in a width direction of the fixed rail,
wherein each side panel includes an aperture to enable an end portion of the protrusion to be positioned in the fixed rail; and
wherein a first end of the moving portion includes a moving roller that comes into contact with one of the side panels disposed at the sides of the fixed rail, respectively.

2. The battery pack holding apparatus according to claim 1, further comprising:
a pair of upper rails extending in a longitudinal direction of the battery pack are disposed under the battery pack; and
a pair of lower rails to be engaged with the upper rails are disposed in the battery pack holder.

3. The battery pack holding apparatus according to claim 2, further comprising:
a sloped portion having a downward slope from an upper end of the upper rail, and disposed adjacent to an outside wall of the upper rail and extends along a longitudinal direction of the upper rail, in which a lower end of the sloped portion is bent toward the high-voltage battery pack.

4. The battery pack holding apparatus according to claim 3, further comprising:
a side roller installed in the battery pack holder to come into contact with the bent lower end of the sloped portion; and
a side elastic portion that presses the side roller toward the bent lower end of the sloped portion.

5. The battery pack holding apparatus according to claim 1, wherein the fixed rail is installed at a lower portion among portions of the front end of the battery pack holder.

6. The battery pack holding apparatus according to claim 1, wherein the contact portion is disposed at a second end of the moving portion and has a sloped shape to cause the contact portion to gradually approach the protrusion as the moving portion slides toward the protrusion.

7. The battery pack holding apparatus according to claim 1, wherein the protrusion is a roller.

8. The battery pack holding apparatus according to claim 1, wherein a first end of the elastic portion is supported by the first end of the moving roller and a second end of the elastic portion comes into contact with the second end of the moving portion to press the contact portion toward the protrusion.

9. The battery pack holding apparatus according to claim 1, further comprising:
a plurality of driving units disposed at respective ends of the fixed rail in the longitudinal direction of the fixed rail and connected to respective ends of the moving portion in the longitudinal direction of the moving portion to cause the moving portion to slide along the fixed rail.

10. The battery pack holding apparatus according to claim 9, wherein each driving unit includes a piston and a cylinder and is configured to move the piston with air pressure or oil pressure to move the moving portion.

11. A battery pack holding apparatus, comprising:
a high-voltage battery pack for a vehicle, wherein the high-voltage battery pack has a protrusion that protrudes from a front end of the battery pack;
a battery pack holder installed within a vehicle body and having a front end opening into which the high-voltage battery pack is placed;
a fixed rail installed at a front end of the battery pack holder and extending in a width direction of the front end;
a moving portion installed to slide along the fixed rail in a width direction of the battery pack holder, wherein the moving portion has a contact portion which comes into contact with the protrusion of the high-voltage battery pack when the high-voltage battery pack is forced to slide further when the high-voltage battery pack is inserted in the battery pack holder; and
an elastic portion disposed in the moving portion to press the contact portion toward the protrusion;
wherein the protrusion is a roller.

12. A battery pack holding apparatus, comprising:
a high-voltage battery pack for a vehicle, wherein the high-voltage battery pack has a protrusion that protrudes from a front end of the battery pack;
a battery pack holder installed within a vehicle body and having a front end opening into which the high-voltage battery pack is placed;
a fixed rail installed at a front end of the battery pack holder and extending in a width direction of the front end;
a moving portion installed to slide along the fixed rail in a width direction of the battery pack holder, wherein the moving portion has a contact portion which comes into contact with the protrusion of the high-voltage battery pack when the high-voltage battery pack is forced to slide further when the high-voltage battery pack is inserted in the battery pack holder;

an elastic portion disposed in the moving portion to press the contact portion toward the protrusion; and a plurality of driving units disposed at respective ends of the fixed rail in the longitudinal direction of the fixed rail and connected to respective ends of the moving portion in the longitudinal direction of the moving portion to cause the moving portion to slide along the fixed rail, wherein each driving unit includes a piston and a cylinder and is configured to move the piston with air pressure or oil pressure to move the moving portion.

* * * * *